(12) United States Patent
Keniston

(10) Patent No.: US 7,523,446 B2
(45) Date of Patent: Apr. 21, 2009

(54) USER-SPACE RETURN PROBES

(75) Inventor: James A. Keniston, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/565,346

(22) Filed: Nov. 30, 2006

(65) Prior Publication Data
US 2008/0133896 A1 Jun. 5, 2008

(51) Int. Cl.
G06F 11/36 (2006.01)
(52) U.S. Cl. ...................................... 717/129
(58) Field of Classification Search .................. 717/129
See application file for complete search history.

(56) References Cited
U.S. PATENT DOCUMENTS
6,490,721 B1 * 12/2002 Gorshkov et al. ........... 717/130
* cited by examiner Primary Examiner—William M Treat
(74) Attorney, Agent, or Firm—Lieberman & Brandsdorfer, LLC

(57) ABSTRACT

A computer system is provided with memory divided by the operating system into kernel space and user space. A probe function is provided in a related user-space application to support dynamic insertion of instrumentation into the application. A breakpoint instruction is provided in an area of the process's user space that will not be overwritten to support execution of an instrumentation subroutine when a probed subroutine in the application returns.

19 Claims, 5 Drawing Sheets

USER-SPACE RETURN PROBES

BACKGROUND OF THE INVENTION

1. Technical Field

This invention relates to monitoring computer implemented instructions. More specifically, the invention relates to user-space probes and storage of a breakpoint instruction in user space for use in monitoring returns from subroutines.

2. Description of the Prior Art

An operating system segregates memory into kernel space and user space. The kernel is the central module in most operating systems that manages the system's resources and communication between hardware and software components. It is the part of the operating system that loads first and remains in main memory. The kernel is responsible for many tasks, including memory management, process and task management, and disk management.

Kprobes, a kernel probe (kprobe) is a simple and lightweight mechanism that allows one to gather additional information about kernel operation without recompiling or rebooting a kernel. Kprobes enables a location in the kernel to be instrumented, such that an instrumentation subroutine runs when the processor encounters that kernel probe. Once the instrumentation subroutine completes execution, the kernel continues normal execution.

When investigating a problem in the kernel or a user program, various types of diagnostic tools may be used. Examples of such diagnostic tools include source-code modifications to log diagnostic messages, interactive debuggers, and dynamic, non-interactive probing systems. This invention pertains to a dynamic, non-interactive probing system. With such a system, instrumentation can be created, installed, and removed dynamically while the instrumented program runs at or near full speed. Examples of such systems include IBM's Dprobes for the OS/2 and Linux operating systems, Sun Microsystems' Dtrace for Solaris, and IBM's Kprobes (kernel probes) and Uprobes (user-space probes) for Linux. In Dprobes and Dtrace, an instrumentation subroutine is written in a special language, and is run on an emulator; this emulator is part of the kernel. In Kprobes and Uprobes, the instrumentation subroutine is written in the same language as the kernel and runs directly on the processor. More specifically, in Kprobes-based instrumentation is built as a kernel module. So, rather than having to recompile and reboot the system with an instrumented kernel, a Kprobes instrumentation module can be written, compiled, and loaded on the system. There is no need to reboot the system. The Kprobes instrumentation module inserts a kprobe at a specific instruction. More specifically, Kprobes replaces the specified instruction, or the first byte(s) thereof, with a breakpoint instruction. The effect of the breakpoint instruction, when executed, is to save certain of the processor's registers and transfer control to a breakpoint-handler subroutine in the kernel. This subroutine passes control to Kprobes. The instrumentation provided by a kprobe could be inserted anywhere in a subroutine. In one embodiment, the kprobe is used as a reporting mechanism to help determine the location of a bug in the kernel.

A kernel return probe (kretprobe) is a feature of Kprobes that allows instrumentation to be placed at the return point of any non-inline function in the kernel. In the kretprobe feature, Kprobes needs to gain control of the central processing unit when the probed subroutine returns. This control is accomplished by replacing the return address of the probed subroutine with the address of a piece of code, also known as a trampoline. A trampoline is a small piece of code used to redirect the flow of execution in an unusual way. A trampoline may be a sequence of instructions, or simply an address; the trampoline may be created statically or on the fly, and it may be used to transfer control between kernel and user mode. With respect to a kretprobe trampoline, the trampoline may be a single instruction or a sequence of instructions, depending on the architecture. It's created statically, and transfers control within kernel mode. In the following example of a kretprobe, the trampoline transfers control to Kprobes. FIG. 1 is a block diagram (100) showing how a kernel return probe functions. Return probes work by hijacking the return address upon entry to the probed function. Assume that a return probe has been registered on kernel function bar( ) (102). As a result, a kprobe is registered at the entry to bar( ). When foo( ) (104) calls (110) bar( ) (102), the processor pushes the return address in foo( ) (104) onto the stack, or stores it in a special register, and jumps to bar( ) (102). The entry point kprobe is hit and Kprobes gains control. Kprobes saves a copy of the return address and replaces the return address in the stack, or in the special register, with the address of the aforementioned kretprobe trampoline (106). When the function bar( ) (102) returns, the effect is a jump (112) to the trampoline (106) in place of a normal return (108). The trampoline contains a breakpoint instruction, or other code that transfers control to Kprobes. Kprobes runs the user-specified instrumentation subroutine (not shown) associated with that kretprobe and then jumps to the original return address (120).

As noted above, the operating system includes both user space and the kernel space. User space is the memory area where all user mode applications run. A user application cannot access kernel space directly. There are user-space equivalents of kernel probes and kernel return probes, and these are known as user probes (uprobes) and user return probes (uretprobes), respectively. For a uretprobe, the trampoline can consist of a single breakpoint instruction. A problem arises with the uretprobe as to where to place the breakpoint instruction in the process's address space. Any solution that requires modification of the source code of the user application is unacceptable because it defeats the purpose of the user-return-probe feature (dynamic instrumentation). The breakpoint instruction cannot be placed in any portion of the user process's address space that might be overwritten during execution of the probed function. Therefore, it is not practical to place the breakpoint in the stack or data section of the process's address space.

Accordingly, there is a need for locating the trampoline breakpoint instruction of a user-space return probe in a location in user space that already exists in the process's virtual address space, will not be overwritten during execution of the probed function, and will be uniform across different applications.

SUMMARY OF THE INVENTION

This invention comprises a method and system for monitoring computer-implemented instructions in user programs, and for storing a user-space breakpoint instruction in a predictable location where it will not be overwritten.

In one aspect of the invention, a method is provided for monitoring computer-implemented instructions. A computer system is configured with at least one processor in communication with memory. The computer system includes an operating system in communication with the processor. The operating system runs in kernel space and performs services on behalf of user-space programs. The processor implements a subroutine-call mechanism by saving a return address in temporary storage when a subroutine is called. When a user program is initiated, a first breakpoint instruction is stored in an area of the program's address space that will not be overwritten. When a request is made to monitor returns from a particular subroutine in that program, a second breakpoint instruction is inserted at the entry point of the subroutine to be monitored. Control is transferred to the kernel by the second breakpoint instruction when the subroutine to be monitored is called. The return address of the called subroutine is remembered. Thereafter, the return address is replaced with an address of the first breakpoint instruction.

In another aspect of the invention, a computer system is provided with at least one processor in communication with memory, and an operating system in communication with the processor. The operating system is configured to run in kernel space and to perform services on behalf of user-space programs. The processor implements a subroutine-call mechanism by saving a return address in temporary storage when a subroutine is called. When a user program is initiated, a first breakpoint instruction is stored in an area of the program's address space that will not be overwritten. When a request is made to monitor returns from a particular subroutine in that program, a second breakpoint instruction is inserted at the entry point of the subroutine to be monitored. The second breakpoint instruction transfers control to a kernel mode in response to a call of the subroutine to be monitored. The return address of the called subroutine is remembered and replaced with an address of the first breakpoint instruction.

In yet another aspect of the invention, an article is provided with at least one processor in communication with memory, and an operating system in communication with the processor. The processor implements a subroutine-call mechanism by saving a return address in temporary storage when a subroutine is called. Instructions in the operating system kernel are provided to perform services in the kernel space on behalf of user-space programs. The instructions are in a computer readable medium. Instructions are provided to store, upon initiation of a user program, a first breakpoint instruction in an area of the program's user space that will not be overwritten. Instructions are also provided to insert a second breakpoint instruction at the entry point of a subroutine to be monitored. The second breakpoint instruction transfers control to the kernel when the subroutine to be monitored is called. Instructions are provided to remember the return address of the called subroutine, and to replace the return address with an address of the first breakpoint instruction.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

An efficient and reliable implementation of user return probes entails the storage of a breakpoint instruction in the virtual address space of every user program. Because memory is a limited resource, the operating system is careful to allocate only so much memory as is needed for any particular user program. As such, it is a challenge to find unused space in user-space memory that is not subject to change by an application. The location for the breakpoint instruction must be in an area of user space that has room to store the instruction, as well as an area that will not to be overwritten during execution of the probed subroutine.

Technical Details

Figure 1:
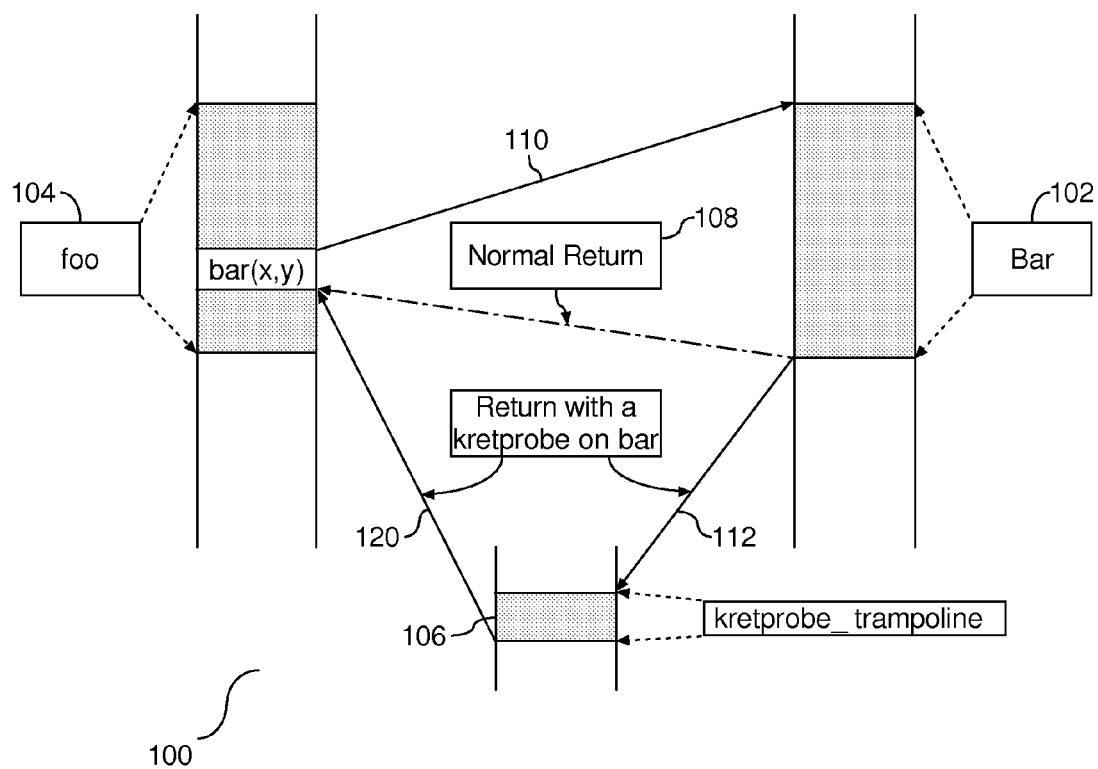
FIG. 1 is a block diagram illustrating a prior art operation of a kernel return probe.
Figure 2:
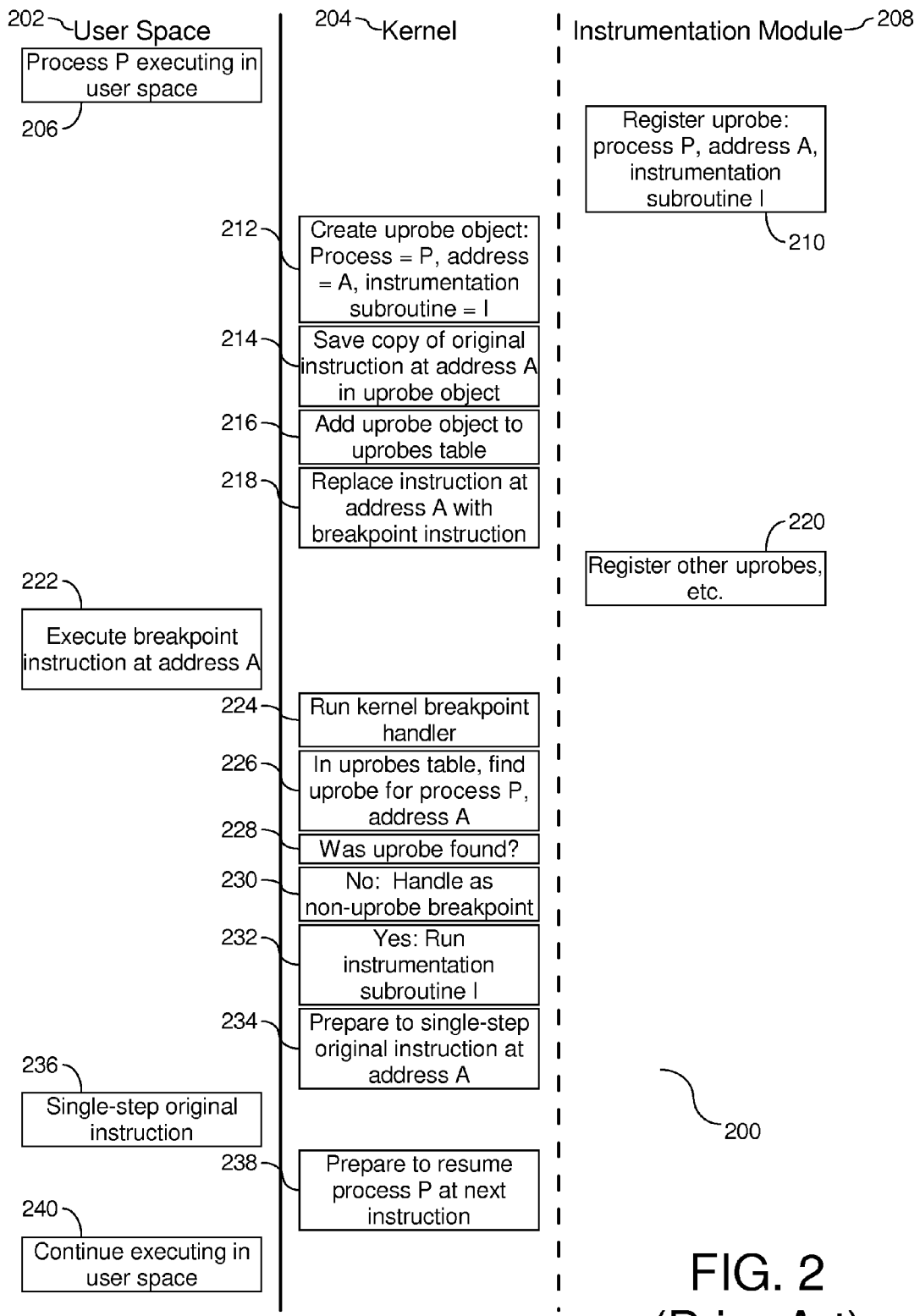
FIG. 2 is a flow chart illustrating a prior art operation of a user-space probe.

FIG. 2 is a prior art flow diagram (200) illustrating an example operation of a user probe, hereinafter referred to as a uprobe. As shown, the flow diagram is divided into two sections; a first section (202) addresses the actions in user space, and a second section (204) addresses actions in the kernel. For example, a process P executes instructions in user space. In our example, an instrumentation module in the form of a loadable kernel module is loaded into the kernel. The instrumentation module includes start-up code to register one or more probepoints, and shut-down code to remove one or more probepoints. While a process P is executing in user space (206), an instrumentation module (208) in the kernel (204) registers a uprobe (210). In one embodiment, the uprobe registration process requires that the programmer identify the process P to be probed, the address of the probepoint A, and the instrumentation subroutine to be run, I, when the probepoint is hit. During the process of registering a uprobe, a uprobe object is created in the kernel (212). The uprobe object identifies the process to be probed, the address A, and the instrumentation subroutine, I. A copy of the original instruction at address A in the process to be probed is saved in the uprobe object (214). Thereafter, the uprobe object is added to a uprobe table in the kernel (214). In one embodiment, the uprobe table is a data structure with a listing of all created uprobe objects. Following step (216), the instruction at address A in the uprobe object is replaced with a breakpoint instruction (218). Steps (210)-(218) outline registering one uprobe in the kernel. Following step (218), the instrumentation module may register other uprobes or uretprobes in the kernel (220).

As noted above, while the instrumentation module is creating one or more uprobes, process P in user space continues execution. At some point when the user-space program is executing and it reaches the probepoint (222), the associated breakpoint instruction is executed and control transfers from user space (202) to the kernel (204). The kernel runs the kernel breakpoint handler (224). A search is conducted in the uprobes table for a uprobe object associated with process P and address A (226). Thereafter, a determination is made as to whether the sought uprobe has been found (228). A negative response to the determination at step (228) results in handling the breakpoint as a non-uprobe breakpoint (230). In one embodiment, the kernel breakpoint handler forwards the process to an interactive debugger. Similarly, a positive response to the determination at step (228) is an indication that the breakpoint is a uprobe breakpoint, and the instrumentation subroutine I, as identified in the uprobe object stored in the uprobe table, is run (232). Thereafter, the kernel sets a flag in the processor to single-step the original instruction at address A (234). Because the single-step flag is set, control returns to the kernel (238) after that instruction has been executed (236). The kernel's single-step handler clears the single step flag (238), and resumes process P at the next instruction (240). Accordingly, as shown in detail in FIG. 2, the user-space probe does not require use of a trampoline.

However, a user-space return probe (uretprobe) does require use of a trampoline, which may be problematic in user space for the reasons outlined above. For certain operating systems and architectures, the kernel creates a special page in the memory and attaches this page to all processes' address spaces at an agreed upon virtual address when they are loaded into memory. This page is known as the virtual dynamic shared object (vdso) page, and contains instructions that implement a system call entry/exit mechanism for all user-space applications. As such, the vdso page functions as a gateway between user space and the kernel. The vdso page is not subject to changes in the manner of data or stack pages of user-space memory. Every user-space process has a vdso page, and there is enough spare space in the vdso page in user space so that storage of a trampoline therein will not impact space availability. Accordingly, the vdso page is a location in user space that may be leveraged to store an instruction that would not be subject to change by a user-space application.

Figure 3A:
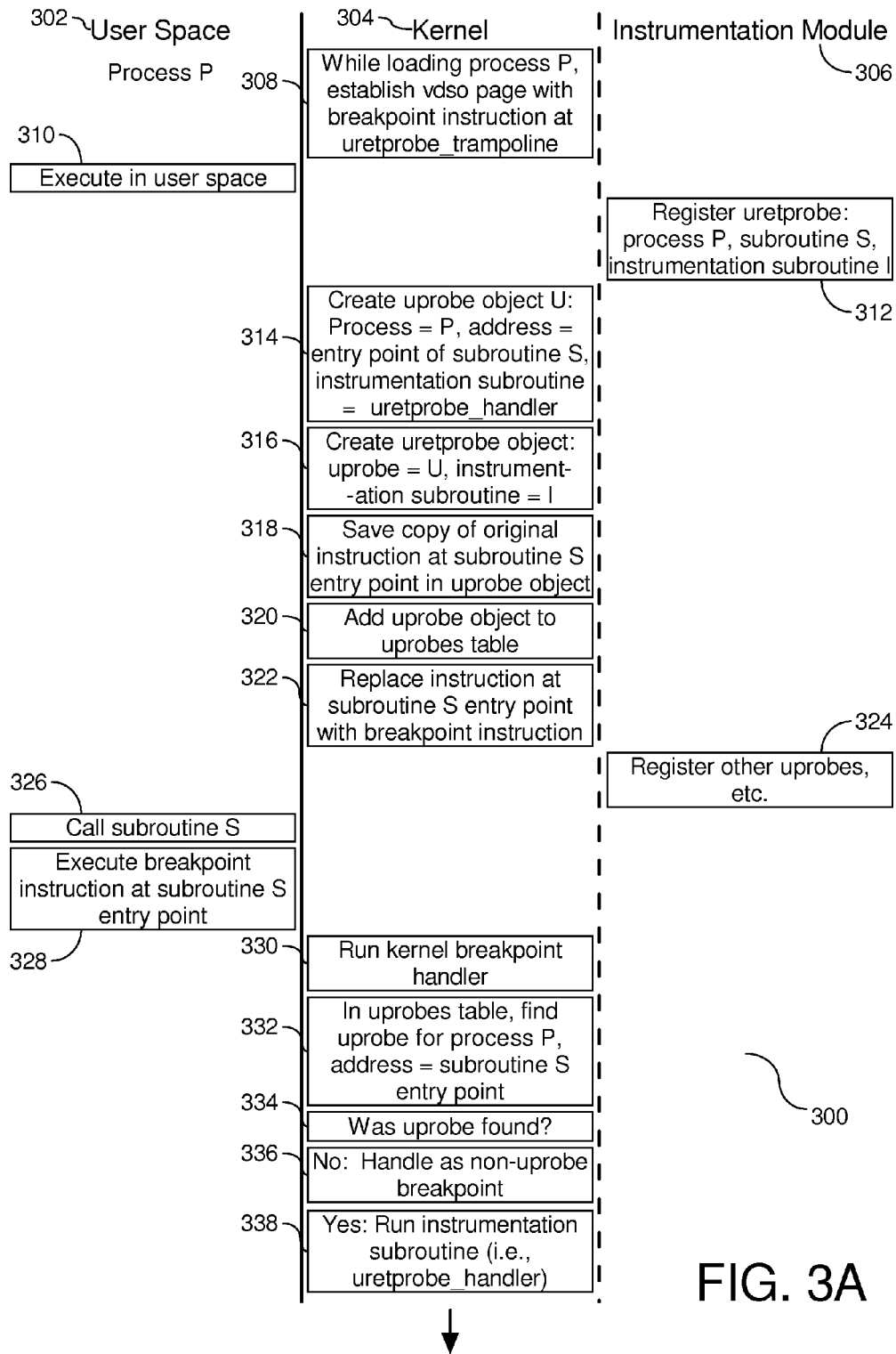
FIGS. 3A and 3B are flow charts illustrating operation of a user-space return probe according to the preferred embodiment of this invention, and are suggested for printing on the first page of the issued patent.
Figure 3B:
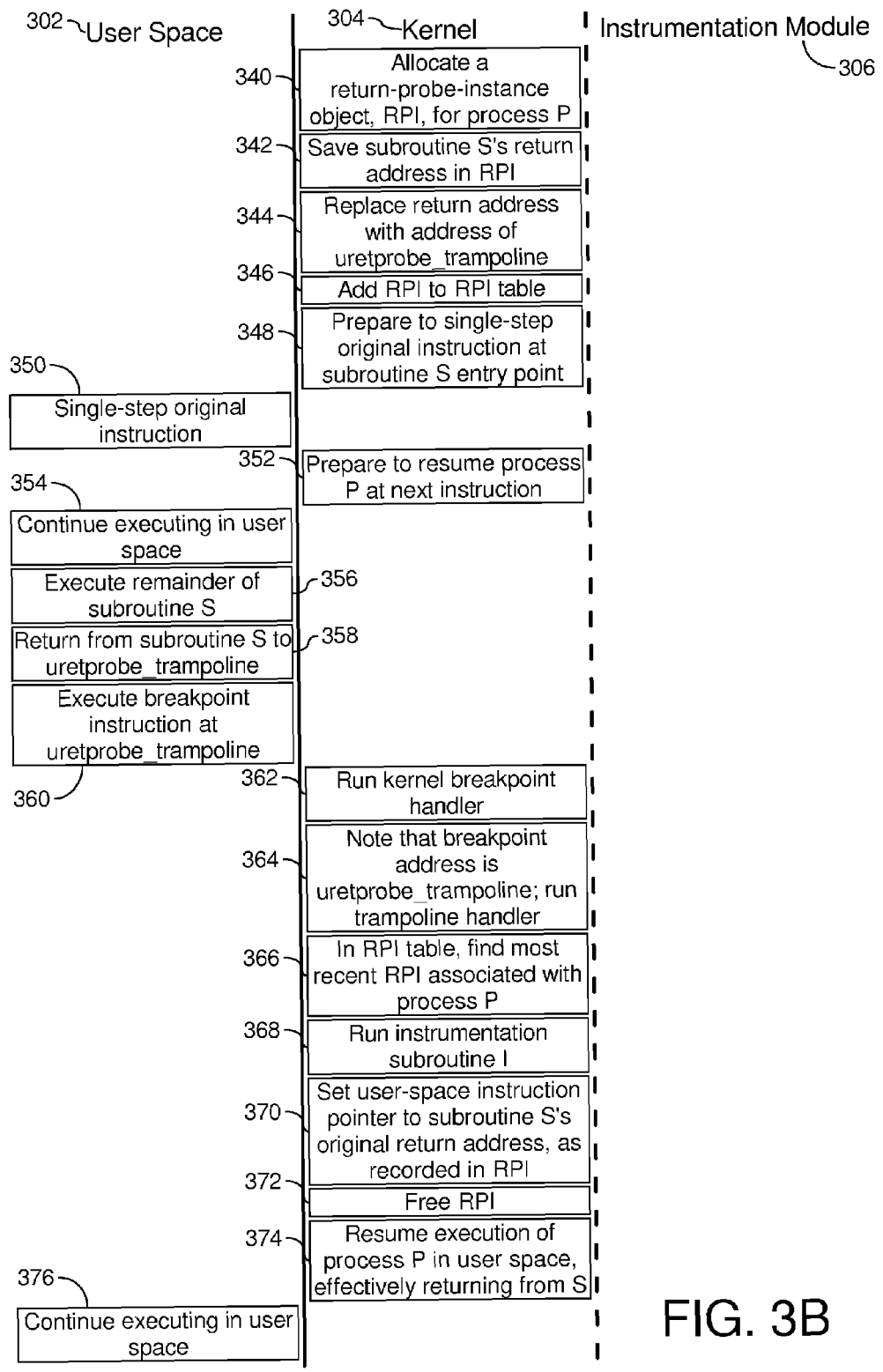

FIGS. 3A and 3B are flow diagrams (300) illustrating an example operation of a user return probe, hereinafter referred to as a uretprobe. As shown, the flow diagram is divided into two sections. A first section (302) addresses the actions in user space, and a second section (304) addresses action in the kernel. For example, a process P executes instructions in user space. In our example, an instrumentation module (306) in the form of a loadable kernel module is loaded into the kernel (304). The instrumentation module includes start-up code to register one or more probepoints and shut-down code to remove one or more probepoints. As noted above, the process of loading process P into memory creates a vdso page with a breakpoint instruction located at the uretprobe trampoline (308). The vdso page with the inserted breakpoint instruction at the uretprobe trampoline is created by the kernel prior to execution of process P and is not determinative as to whether or not process P will get probed. Accordingly, the uretrprobe is established before executing process P in user space (302).

Following the process of storing of the uretprobe trampoline, process P begins execution in user space (310). While process P is executing in user space (302), the instrumentation module registers a uretprobe (312). In one embodiment, the uretprobe registration process requires that the programmer identify the process to be probed, i.e., the process P that is being executed in user space (302); the subroutine, S, in process P, to be probed; and the instrumentation subroutine to be run, I, when subroutine S returns. During the process of registering the uretprobe (312), a uprobe object, U, is created in the kernel (314). The uprobe object, U, identifies the process to be probed, P, the address of the entry point of subroutine S, and a special instrumentation subroutine, known as the uretprobe handler. In addition, a uretprobe object is created in the kernel (316). The uretprobe object identifies the uprobe object, U, and the instrumentation subroutine I. A copy of the original instruction in user space at the entry to subroutine S is saved in the uprobe object (318). Thereafter, the uprobe object, U, is added to a uprobe table in the kernel (320). In one embodiment, the uprobe table is a data structure with a listing of all created uprobe objects. Following step (320), the instruction at subroutine S in the uprobe object is replaced with a breakpoint instruction (322). Steps (314)-(322) outline registering one uretprobe object in the kernel. Following step (322), the instrumentation module may register other uprobes or uretprobes in the kernel (324).

As noted above, while the instrumentation module is creating one or more uprobes and uretprobes, process P in user space continues execution. At some point when user-space process P is executing it calls subroutine S (326). At the entry point to subroutine S, process P executes the previously inserted breakpoint instruction (328). Execution of the breakpoint instruction transfers control from user space (302) to the kernel (304). The kernel runs the kernel breakpoint handler (330), and a search is conducted in the uprobes tables for a uprobe object associated with process P and the entry point for subroutine S (332). Thereafter a determination is made as to whether the sought uprobe has been found (334). A negative response to the determination at step (332) results in handling the breakpoint as a non-uprobe breakpoint (336). For example, in one embodiment, the kernel breakpoint handler forwards the process to an interactive debugger. A positive response to the determination at step (334) is an indication that the breakpoint is a uprobe breakpoint, and the instrumentation subroutine, uretprobe_handler, as identified in the uprobe object stored in the uprobe table, is run (338).

Following step (338), the return address of the subroutine S is replaced with the address of the trampoline stored in the vdso page. Steps (340)-(346) outline this process. A return probe instance object, RPI, is allocated for process P (340), and the return address for subroutine S is saved in the RPI (342). Following step (342), the return address for subroutine S is replaced with the address of the uretprobe trampoline (344), and the RPI is added to an associated RPI table (346). Upon completion of this replacement, the kernel sets a flag in the processor to single-step the original instruction at the entry point to subroutine S (348). Because the single-step flag is set, control returns to the kernel (352) after that instruction has been executed (350). Thereafter, the kernel's single-step handler clears the single step flag (352), and resumes process P at the next instruction (354).

Process P executes the remainder of subroutine S (356). Upon a completion of the instructions in subroutine S, process P executes a return instruction. Because of the aforementioned return-address replacement, the effect of the return instruction is a jump to the uretprobe trampoline (358). Process P executes the breakpoint instruction at the uretprobe trampoline (360). Execution of the breakpoint instruction transfers control from user space (302) to the kernel (304). The kernel runs the kernel breakpoint handler (362). Since the breakpoint address is the address of the uretprobe trampoline, the kernel notes that the breakpoint address is the uretprobe trampoline and the kernel runs the trampoline handler (364). A search is conducted in the RPI table to find the most recent RPI associated with process P (366), and the instrumentation subroutine I is run (368). Thereafter, the user space instruction pointer is set to the original return address of subroutine S as it is recorded in the RPI (370), and the RPI is removed from the RPI table (372). Following step (372), execution of process P resumes (374) in user space (302), effectively returning from subroutine S as shown at (376). Accordingly, the modification to the uretprobe with the use of the vdso page enables the trampoline to be stored in user space.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 4:
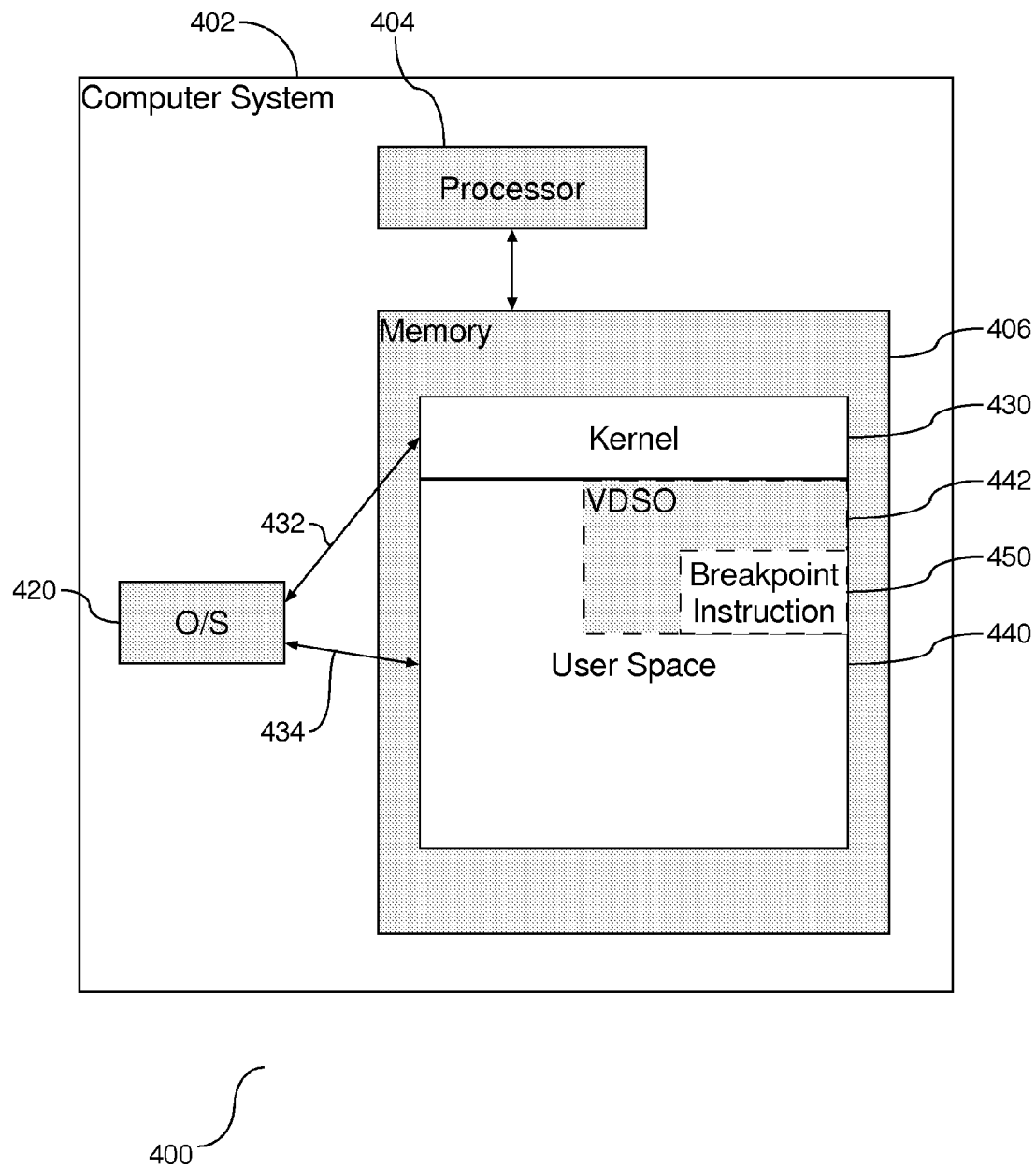
FIG. 4 is a block diagram of a computer system showing the kernel and user space.

FIG. 4 is a block diagram (400) illustrating a computer system (402) with a processor (404) in communication with memory (406) showing the hardware layout of the computer system and the location of the vdso page in the user space. The memory (406) houses the kernel space (430) and user space (440). The operating system (420) is shown in communication with both the kernel space (430) and the user space (440) at (432) and (434), respectively. Pages of memory (not shown) are provided in the user space (440), including a vdso page (442). The first breakpoint instruction (450) is shown stored in the vdso page (442).

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

In one embodiment, the subroutine-call mechanism is provided in processor hardware, wherein the processor implements a subroutine-call mechanism by saving a return address in temporary storage when a subroutine is called. Instructions in the operating system kernel are provided to perform services in the kernel on behalf of user-space programs. With respect to this implementation, each instruction may include, but is not limited to, a sequence of one or more bytes. The software implementation can take the form of a computer program product accessible from a computer-useable or computer-readable medium providing program code for use by or in connection with a computer or any instruction execution system.

Network adapters may also be coupled to the system to enable the data processing system to become coupled to other data processing systems or remote printers or storage devices through intervening private or public networks. Modems, wireless and Ethernet adapters are just a few of the currently available types of network adapters.

Advantages over the Prior Art

Storage of the uretprobe trampoline's breakpoint instruction in the vdso page enables the breakpoint instruction to be stored in user space in a manner that does not subject the breakpoint instruction to change. Every process in user space has a vdso page with a sufficient amount of space to store the trampoline. Storage of the trampoline in the vdso page will not have an impact on space availability in user space.

Alternative Embodiments

It will be appreciated that, although specific embodiments of the invention have been described herein for purposes of illustration, various modifications may be made without departing from the spirit and scope of the invention. In particular, the first breakpoint instruction that is used to transfer control to the kernel when the probed function returns can be stored in various other locations in user space and is not limited to the vdso page. Any location in memory used to store the breakpoint instruction must be able to ensure that the instruction will not be overwritten during execution of the probed function. For example, in one embodiment the solution is to locate the breakpoint instruction in an unused portion of the process's executable-code section, such as in the gap between the last (highest-addressed) instruction and the end of the memory page that contains that instruction. Another embodiment is to allocate an extra page of memory for every process at startup, and to place the breakpoint instruction in this page. Accordingly, the scope of protection of this invention is limited only by the following claims and their equivalents.

I claim:

1. A method for monitoring computer-implemented instructions comprising:
    configuring a computer system with at least one processor in communication with memory, said computer system including an operating system in communication with said processor, said operating system running in kernel space and performing services on behalf of one or more user-space programs, said processor implementing a subroutine-call mechanism by saving a return address in temporary storage when a subroutine is called;
    during initiation of a user process, storing a first breakpoint instruction in an area of said process's user space that will not be overwritten;
    inserting a second breakpoint instruction at a user-space instruction address when a request is made to monitor a return from a particular subroutine of one of said user-space programs, wherein said address is an entry point of a subroutine to be monitored;
    transferring control to kernel mode, by said second breakpoint instruction, when said subroutine to be monitored is called; and
    remembering the return address of said called subroutine, and replacing said return address with an address of said first breakpoint instruction.

2. The method of claim 1, further comprising executing of an instrumentation subroutine in kernel space upon return of the user-space subroutine and the resulting transfer of control to the first breakpoint instruction.

3. The method of claim 2, further comprising returning to said remembered user-space address upon completion of said instrumentation subroutine in said kernel space.

4. The method of claim 1, wherein said temporary storage is selected from the group consisting of a processor register and a memory location.

5. The method of claim 1, wherein said first breakpoint instruction is stored in a vdso page in said user space.

6. The method of claim 1, wherein said first breakpoint instruction is stored in a location selected from the group consisting of: an unused portion of said process's executable-code section, and an extra page of memory created for said process at startup.

7. A computer system comprising:
at least one processor in communication with memory;
an operating system in communication with said processor, said operating system configured to run in kernel space and to perform services on behalf of at least one user-space program;
a subroutine-call mechanism implemented by said processor that saves a return address saved in temporary storage when said subroutine is called;
a first breakpoint instruction stored, during initiation of a user process, in an area of said process's user space that will not be overwritten;
a second breakpoint instruction inserted at a user-space instruction address when a request is made to monitor a return from a particular subroutine of said user-space process, wherein said address is an entry point of a subroutine to be monitored;
said second breakpoint instruction to transfer control to a kernel mode in response to a call of said subroutine to be monitored;
said return address of said called subroutine to be remembered and replaced with an address of said first breakpoint instruction.

8. The system of claim 7, further comprising an instrumentation subroutine in kernel space to be executed upon return of said user-space subroutine and transfer of control to said first breakpoint instruction.

9. The system of claim 8, further comprising a return to said remembered user-space address upon completion of said instrumentation subroutine in said kernel space.

10. The system of claim 7, wherein said temporary storage is selected from the group consisting of a processor register and a memory location.

11. The system of claim 7, wherein said first breakpoint instruction is stored in a vdso page in said user space.

12. The system of claim 7, wherein said first breakpoint instruction is stored in a location selected from the group consisting of: an unused portion of said process's executable-code section, and an extra page of memory created for said process at startup.

13. An article comprising:
at least one processor in communication with memory;
an operating system in communication with said processor, said operating system configured to run in kernel space and to perform services on behalf of user-space programs;
said processor to implement a subroutine-call mechanism by saving a return address in temporary storage when a subroutine is called;
instructions in said operating system kernel, said instructions being in a computer readable medium for performing services in kernel space on behalf of one or more user-space programs, comprising:
instructions to store, during initialization of a user process, a first breakpoint instruction in an area of said process's user space that will not be overwritten;
instructions to insert a second breakpoint instruction at a user-space instruction address when a request is made to monitor a return from a particular subroutine of one of said user-space programs, wherein said address is an entry point of a subroutine to be monitored;
said second breakpoint instruction to transfer control to kernel mode when said subroutine to be monitored is called; and
instructions to remember the return address of said called subroutine, and replace said return address with an address of said first breakpoint instruction.

14. The article of claim 13, wherein said medium is a recordable data storage medium.

15. The article of claim 13, further comprising instructions to execute an instrumentation subroutine in kernel space upon return of the user-space subroutine and the resulting transfer of control to the first breakpoint instruction.

16. The article of claim 15, further comprising instructions to return to said remembered user-space address upon completion of said instrumentation subroutine in said kernel space.

17. The article of claim 13, wherein said temporary storage is selected from the group consisting of a processor register and a memory location.

18. The article of claim 13, wherein said first breakpoint instruction is stored in a vdso page in said user space.

19. The article of claim 13, wherein said first breakpoint instruction is stored in a location selected from the group consisting of: an unused portion of said process's executable-code section, and an extra page of memory created for said process at startup.

* * * * *